United States Patent
Kaliveh et al.

(10) Patent No.: US 7,587,973 B2
(45) Date of Patent: Sep. 15, 2009

(54) ROASTING RACK ASSEMBLY

(75) Inventors: Zahra Mojgan Kaliveh, Blaine, MN (US); Hossein Vanaki, Blaine, MN (US)

(73) Assignee: Intelligent Ideas Inc., Columbia Heights, MN (US)

( * ) Notice: Subject to any disclaimer, the term of this patent is extended or adjusted under 35 U.S.C. 154(b) by 854 days.

(21) Appl. No.: 11/158,578

(22) Filed: Jun. 22, 2005

(65) Prior Publication Data

US 2006/0130673 A1    Jun. 22, 2006

Related U.S. Application Data

(60) Provisional application No. 60/637,689, filed on Dec. 20, 2004.

(51) Int. Cl.
*A47J 37/07* (2006.01)

(52) U.S. Cl. .......................................... 99/450; 99/449

(58) Field of Classification Search ........................ None
See application file for complete search history.

(56) References Cited

U.S. PATENT DOCUMENTS

| | | | |
|---|---|---|---|
| 1,263,863 A | 4/1918 | Crosby | |
| 2,214,137 A * | 9/1940 | Irwin et al. | 99/426 |
| 2,222,089 A * | 11/1940 | Saffell | 99/426 |
| 2,450,716 A | 10/1948 | Chittick | 294/1 |
| 2,513,177 A * | 6/1950 | Irwin | 99/449 |
| 2,520,389 A * | 8/1950 | Ferris | 99/449 |
| 2,549,709 A * | 4/1951 | Potts | 99/449 |
| 2,634,674 A * | 4/1953 | Irwin | 99/419 |
| 2,703,046 A | 3/1955 | Ahlquist | 99/449 |
| 3,075,798 A | 1/1963 | Smith | 294/15 |
| 3,084,617 A * | 4/1963 | Jamentz | 99/426 |
| 3,338,486 A | 8/1967 | Gaylor | 224/49 |
| 3,585,922 A * | 6/1971 | Peterson et al. | 99/355 |
| 4,178,844 A * | 12/1979 | Ward et al. | 99/449 |
| 4,191,160 A * | 3/1980 | Elliott | 126/9 R |
| 4,407,189 A * | 10/1983 | Bentson | 99/421 HH |
| 4,677,906 A | 7/1987 | Lowe | 99/450 |
| 4,718,402 A * | 1/1988 | Fordyce | 126/337 R |
| 5,572,924 A * | 11/1996 | Crnjanski | 99/426 |
| 5,638,742 A | 6/1997 | Kassaseya | 99/426 |
| 6,164,194 A * | 12/2000 | Westmoreland | 99/426 |
| 6,457,594 B1 * | 10/2002 | Tiemann | 211/181.1 |
| 6,595,120 B1 * | 7/2003 | Tiemann | 99/426 |

* cited by examiner

*Primary Examiner*—Thor S Campbell
(74) *Attorney, Agent, or Firm*—Nawrocki, Rooney & Sivertson, P.A.

(57) ABSTRACT

A roasting rack assembly having a roasting rack for receipt of a roast, and a rack support structure is provided. The rack support structure includes a frame for receipt of the roasting rack, and legs depending from the frame. The frame is adapted to permit egress of the roasting rack therefrom in furtherance of delivering a roast from the roasting rack, through the rack support structure, and to a serving platter underlying the rack support structure.

20 Claims, 4 Drawing Sheets

US 7,587,973 B2

ROASTING RACK ASSEMBLY

This is a regular application filed under 35 U.S.C. §111(a) claiming priority under 35 U.S.C. §119(e) (1), of provisional application Ser. No. 60/637,689 having a filing date of Dec. 20, 2004.

TECHNICAL FIELD

The present invention generally relates to a roasting rack assembly, more particularly, a roasting rack assembly which permits direct delivery of a roast from the assembly to and upon a serving platter without lifting or handling of the roast.

BACKGROUND OF THE INVENTION

Traditionally, the serving of a roast has had associated with it a certain amount of formality, as perhaps best exemplified by Rockwell's Thanksgiving images. The delivery of a whole roast, e.g. a turkey, from a roasting rack, tray, or pan to the serving platter is a task arguably requiring more muscle than art, science, or gadgetry. In lieu of carving the bird in the roasting pan and arranging it thereafter upon a serving platter, it remains desirable to deliver it, in its entirety, onto a platter for spotlighting at the table.

Heretofore known "solutions" to the roast delivery problem are generally directed to lifting (i.e., scooping) or holding utensils which characteristically may be disintegrated into components in furtherance of removal from about or around a roast once delivered to a platter, see e.g., U.S. Pat. No. 1,263,863 (Crosby), U.S. Pat. No. 2,450,716 (Chittick), U.S. Pat. No. 2,703,046 (Ahlquist), U.S. Pat. No. 3,075,798 (Smith), U.S. Pat. No. 3,338,486 (Gaylor), U.S. Pat. No. 5,638,742 (Kassaseya), and U.S. Pat. No. 6,164,194 (Westmoreland). Although such lifting aides may in fact aid lifting, muscling of the roast to the platter remains an essential step of the table presentation.

In contradistinction to lifting utensils per se, U.S. Pat. No. 4,677,906 (Lowe) and U.S. Pat. No. 3,585,922 (Peterson) generally disclose roasting devices, a pan insert and basket respectively, from which the roast is slid, i.e., dumped, into a platter (Lowe), or taken apart such that the basket floor remains under the roast in the platter to prevent unwanted sliding (Peterson). Although possessing greater structural integrity than most of the traditional utensils, the subject devices nonetheless suffer a variety of shortcomings, e.g., Lowe requires transfer of a heavy roast from a low friction surface to a platter having a low friction surface, the ability to control such transfer being limited to a literal "hands-on" technique, or otherwise stabbing the roast with a fork or the like to aid the transfer; Peterson, although permitting a controlled lifted transfer to a platter, leaves behind and visible the basket base which is interposed between the platter and the roast. Thus, it remains advantageous to provide a roasting rack assembly for delivery a roast directly to a serving platter, more particularly, an assembly which is configurable so as to "drop" a roast into an underlying platter, thus avoiding heretofore known tilting of the rack, or securing the roast by hand or with a utensil during a transfer operation.

SUMMARY OF THE INVENTION

The subject roasting rack assembly generally includes a roasting rack for receipt of a roast, and a rack support structure or frame which preferably includes opposingly paired spaced apart frame elements. The roasting rack is selectively received between the opposingly paired frame elements, and is supported thereby. Advantageously, handles extend from the frame elements, and may even unite same. The frame is likewise advantageously adapted, as by the inclusion of legs, so as to maintaining the roast in an elevated condition above a roasting pan and, the support structure preferably includes, along a perimeter edge thereof, an upstanding rail element, i.e., a roast "curb."

Functionally, the rack assembly is intended to be received within a roasting pan, and thereafter delivered for receipt upon, or at least over, a serving platter. Subsequently, the rack is easily disengaged from the frame while the roast "drops" directly into the underlaying serving platter. To the extent the roast moves with the rack, the curb or rail provides sufficient interference so that roast remains within the perimeter of the frame, and drops therethrough. Should the roast exceed the dimension of the frame, more particularly the perimeter configuration thereof, and thusly be left supported thereon subsequent to rack removal, it is contemplated that one or more frame edges, or more generally, a portion of the rack support structure, be disengageable, more particularly, disintegratable, so as to remove the rack support structure from about the roast, and thereby deposit it as intended, alone upon the platter.

In an alternate embodiment, the roasting rack is of a two piece or part construction, the portions thereof being slid to/from the support frame in opposing directions in furtherance of delivering the roast to the serving platter. Advantageously, whether the assembly includes a single rack or rack portions, disengagement may be effectuated by substantially parallel extension of the rack, or angulated extension, say up to about 45°, which is enabled by an increased spacing between frame elements. More specific features and advantages obtained in view of those features will become apparent with reference to the drawing figures and DETAILED DESCRIPTION OF THE INVENTION.

BRIEF DESCRIPTION OF THE DRAWINGS

Referring now to the drawings wherein like numerals are used to designate like parts of the invention throughout the figures.

DETAILED DESCRIPTION OF THE INVENTION

Figure 1:
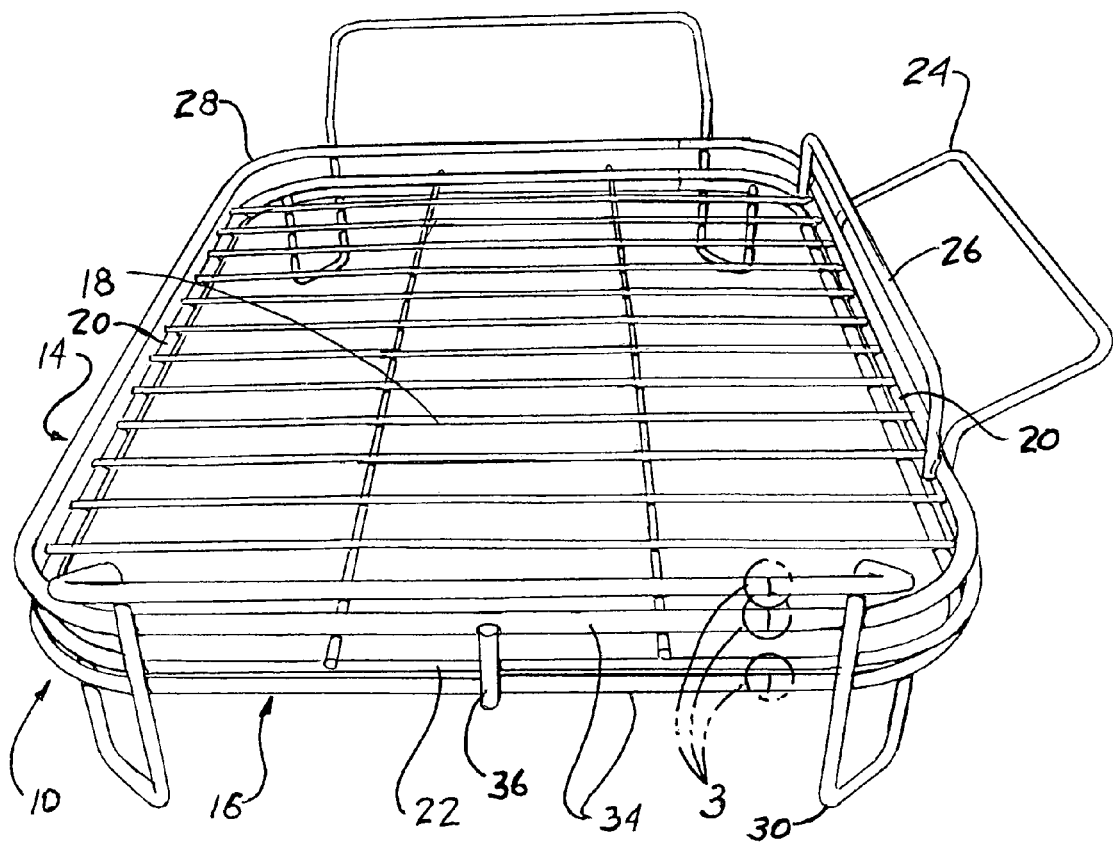
FIG. 1 is a end perspective view, from slightly above, of the roasting rack of the subject invention.
Figure 2:
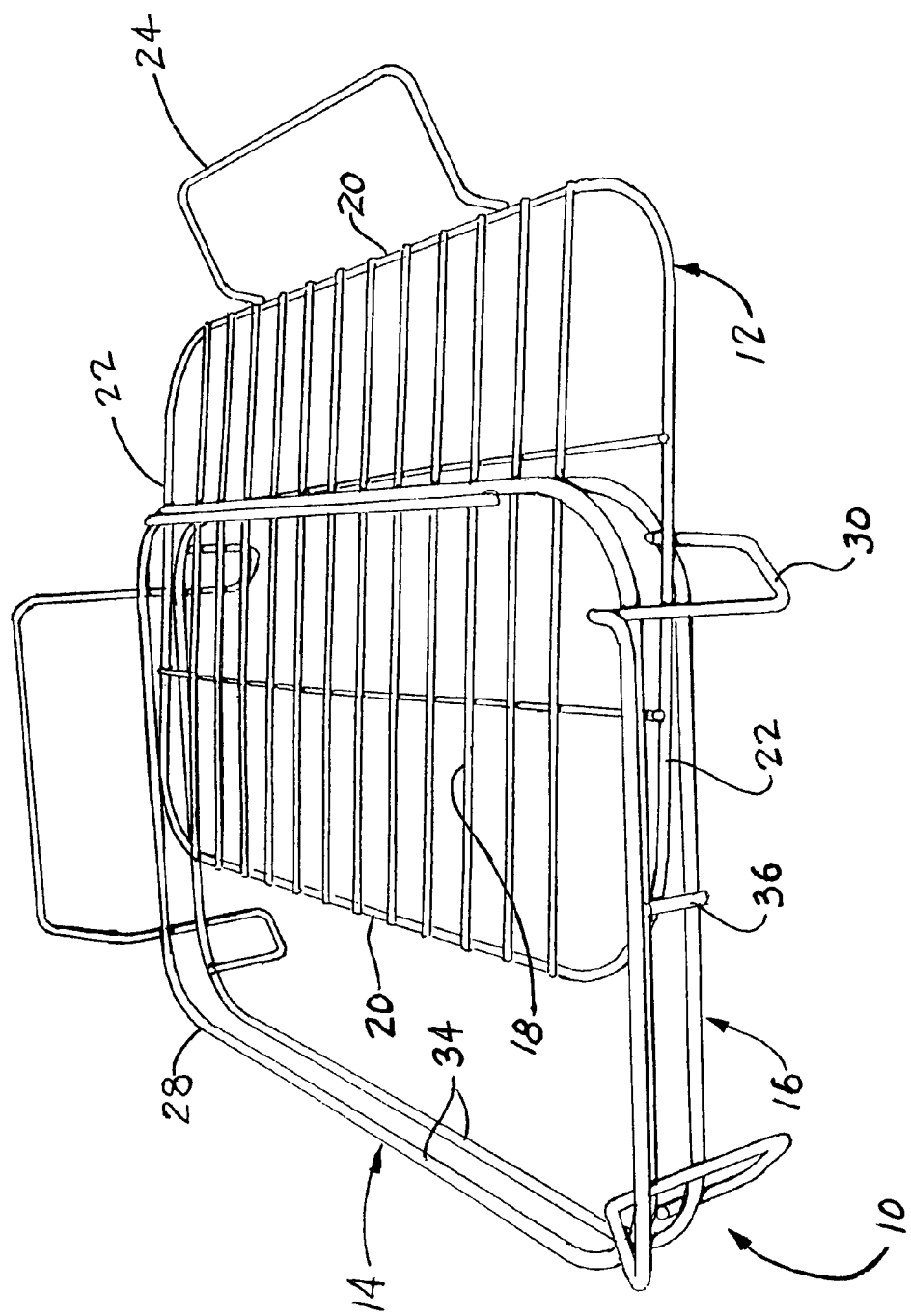
FIG. 2 depicts the roasting rack assembly of FIG. 1, the roasting rack thereof shown in a partially withdrawn condition with respect to the rack support structure, more particularly, the frame thereof.

With general reference to FIGS. 1 and 2, the roasting rack assembly 10 of the subject invention generally includes a roasting rack 12 for receipt of a roast, and a rack support structure 14 for reversible receipt of the roasting rack 12, more particularly, the rack support structure 14 of the assembly 10 includes a frame 16 for receipt of the roasting rack 12. Functionally, the assembly 10 is configured such that the roasting rack 12 is easily removed from the frame 16 of the rack support structure 14 (FIG. 2) in furtherance of delivering a roast from the rack 12 directly to and upon a serving platter or the like, not shown, underlaying the assembly 10.

The roasting rack 12 of the subject assembly 10 generally includes grate-like elements 18 traversing opposingly paired sides or edges of the rack 12. As shown, a plurality of grate-like elements 18 traverse paired major edges 20 of the rack, while a pair of grate-like elements traverse paired minor edges 22 thereof. It is to be understood that the subject arrangement is illustrative, and should not be construed as limiting in any way.

Advantageously, a handle 24 extends from an edge 20, 22 of the rack 12, preferable first extending upwardly, and thereafter outwardly as shown. In-as-much as a substantial parallel, i.e., horizontal, extension of the rack 12 from the frame 16 of the support structure 14 is functionally suitable, an angulated extension of the rack 12 from the frame 16 is especially advantageous, as will later be discussed. The handle 24, equivalents thereof, and even the rack per se, each may be configured in a variety of known ways so as to permit easy hand or finger grasping in furtherance of manipulation of the rack 12, e.g., via translation or sliding thereof, in relation to the rack support structure 14.

The frame 16 of the rack support structure 14 advantageously includes one or more upstanding segments 26, e.g., a rail, a curb, a bar, sidewall, etc., which is intended to intercept a travel path of a roast during egress of the roasting rack 12 from the rack support structure 14. To the extent the roast moves with the rack 12, the one or more upstanding segments 26 essentially "stops" the roast at the frame perimeter 28 while the rack 12 proceeds from partial to full removal from the rack support structure 14, the roast being left behind, advantageously within the perimeter 28 of the frame 16 of the support structure 14, so as to be directly deposited to an underlaying roast receiver, e.g., serving platter.

As shown, the frame 16 is advantageously configured for receipt and support of the roasting rack 12. Preferably, but not necessarily, the frame 16 has an elongate perimeter configuration, e.g., oblong, rectangular, oval, etc., however, other configurations are suitable, and perhaps even desirable, e.g., square, round, triangular, etc. In addition to the frame 16, the rack support structure 14 preferably, but not necessarily, includes legs 30, depending from the frame 16, and opposing paired handles 32 extending from the frame 16, shown having a configuration/geometry as the handle 24 associated with the rack 12.

The frame 16, as shown, preferably includes a pair of spaced apart frame elements 34, the roasting rack 12 being reversibly received therebetween. Frame spacers 36 link the spaced frame elements 34, i.e., the frame elements 34 are spaced apart via the spacers 36, and advantageously, either the legs 30 or the handles 32, or both, of the support structure 14 may integrate, or further integrate the frame elements 34. For instance, as shown, the legs 30 and handles 32 are advantageously integrally formed (i.e., each side of the opposing sides of handles 32 terminally form leg 30) and combine with the frame 16 so as to supply rigidity to the support structure 14 and further maintain the opposingly paired frame elements 34 in spaced apart condition. As should be readily appreciated, the spacing between frame elements 34 directly relates to the degree of egress angulation, especially initial, as opposed to continued or progressing angulation, for the roasting rack 12 from the support structure 14, which preferably is within the range of about 0-45°, and which progressively could exceed same, and even approach 90°.

Optionally, and advantageously, the rack support structure 14 may be easily disintegrated, i.e., disassemble into at least two portions, utilizing a variety of known mechanical interfaces, so as to facilitate delivery of an "oversized" roast, i.e., a roast, e.g., a large turkey, having a configuration which exceeds the "footprint" of the rack support structure, more particularly, the frame thereof. In such scenario, subsequent to rack egress and removal from the rack support structure 14, the roast is likely to be left in an at least partially supported condition upon portions of the support frame 16. Disintegration of a portion of either the frame 16 of the support structure 14, or the support structure 14 itself, permits direct delivery of the large roast to and upon the serving platter. Furthermore, the separability of the rack support structure 14 greatly facilitates cleaning, components thereof being more manageable than the whole.

Figure 3:
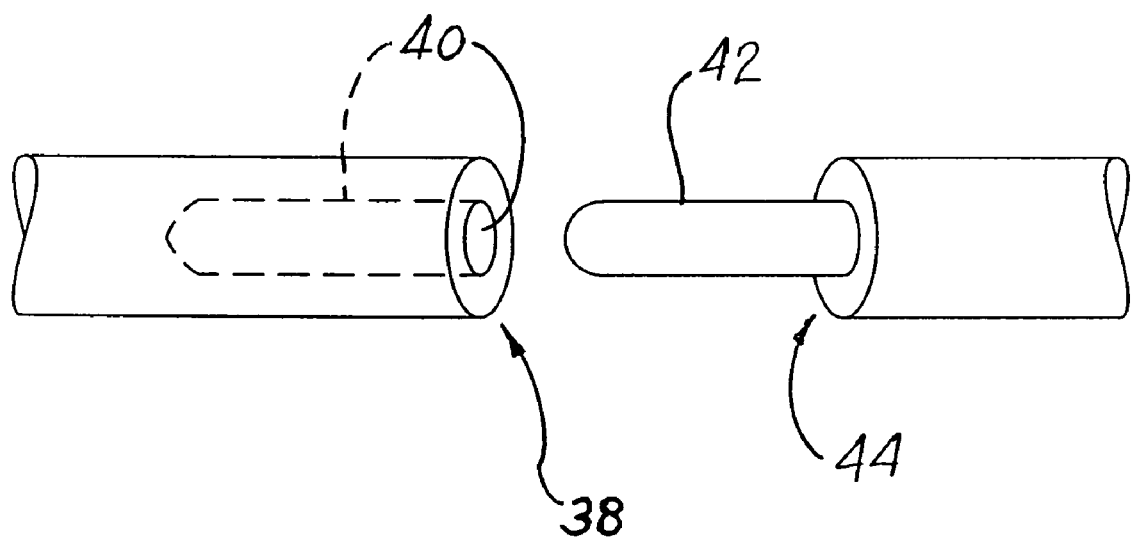
FIG. 3 depicts optional structural/functional detail, as indicated via the circled areas of FIG. 1, relating to the rack support structure of the subject invention; and, FIG. 4 depicts an alternate embodiment of the roasting rack assembly of the subject invention, more particularly, an assembly wherein the roasting rack comprises first and second rack portions.

Referring now to FIGS. 1 & 3, optional support structure details or features, namely exemplary means for reversible integration/disintegration of structure portions, are indicated. More particularly, opposing paired minor edges 22 of the support structure 14, i.e., frame elements 34 and handles 32, are shown bifurcated (i.e., as having opposing free ends), and adapted in a known way for cooperative engagement. For example, as shown, means for linking the portions may include male/female finished ends, i.e., one end 38 includes a cavity 40 for receipt of a reduced diameter portion 42 of the other end 44. Sleeves or couplings may also be suitably utilized to unite the two halves of the support structure. It is to be understood that the subject description is intended to be illustrative and non-limiting, means for disintegrating the support structure, or frame thereof being well known, see e.g., U.S. Pat. No. 1,263,863 (Crosby), U.S. Pat. No. 3,075,798 (Smith), U.S. Pat. No. 2,703,046 (Ahlquist), U.S. Pat. No. 6,164,194 (Westmorland), each of which is incorporated by reference for such teaching. Furthermore, although not shown, it is likewise contemplated that at least a single frame edge, or a frame edge portion, be adapted so as to be easily and reversibly removable in furtherance of support structure disintegration as heretofore discussed.

Figure 4:
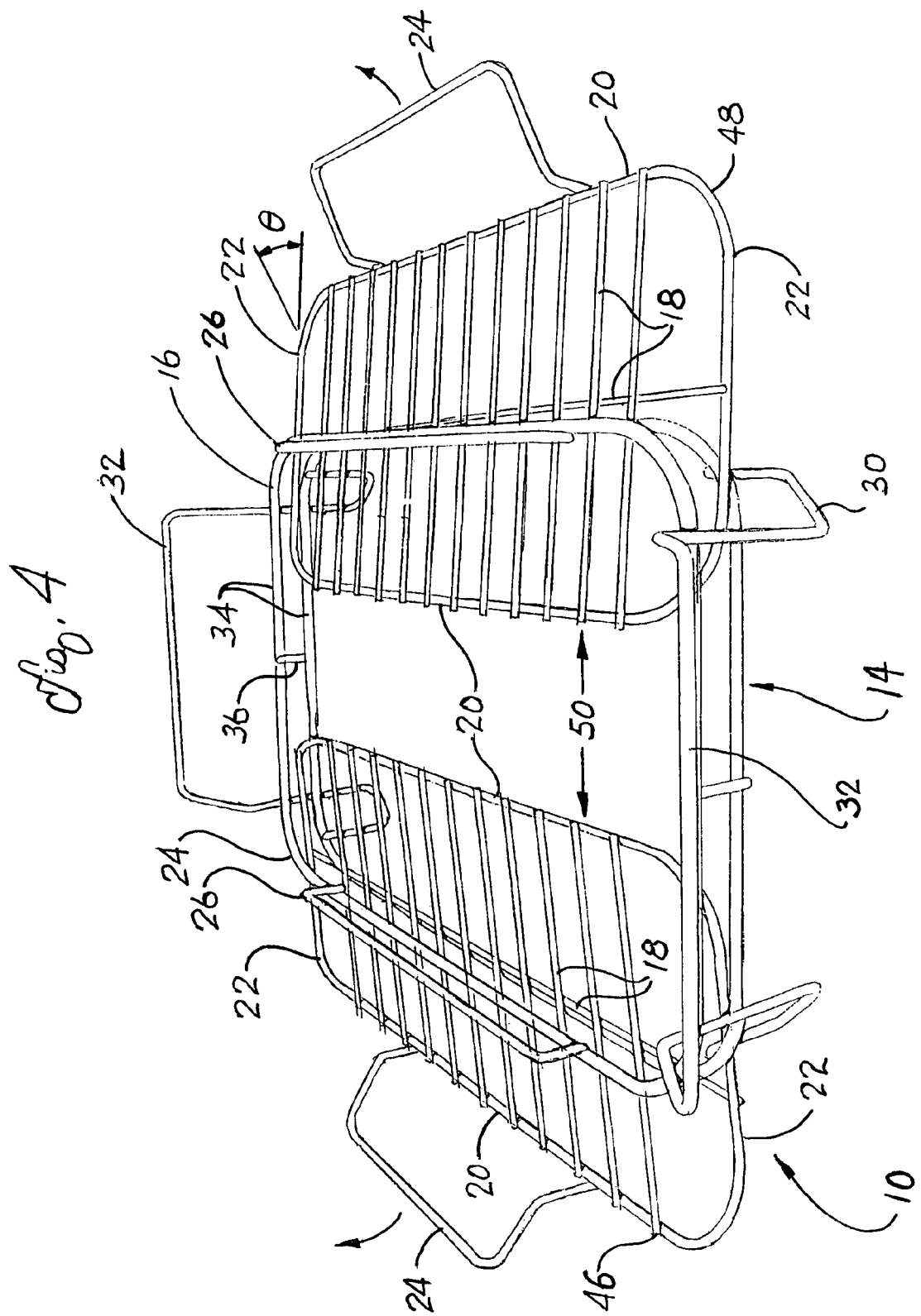

Referring now to FIG. 4, an alternate embodiment of the roasting rack assembly 10 of the subject invention is illustrated, more particularly, an assembly 10 wherein the roasting rack 12 includes discrete first 46 and second 48 portions which are each reversibly received within frame 16 of the rack support structure 14. In furtherance of delivering a roast to and directly upon the serving platter, the rack portions 46, 48 are opposingly slide from between the frame elements 34.

Preferably, as shown, but not necessarily, the support structure 14 has been adapted in comparison to that of FIGS. 1 & 2 via the inclusion of a further upstanding segment 26a, opposite the upstanding segment 26 (as FIGS. 1 & 2), to further facilitate "separation" of the roast from the rack, in this instance, from each rack portion 46, 48. It should be readily appreciated that with the utilization of the subject rack portions, the upstanding support structure segments 26, 26a may be eliminated altogether. Functionally, as the handles 24 of the rack portions 46, 48 are drawn apart, a roast receiving gap 50 immediately forms, gravity takes over, and the handles of the rack portions become somewhat elevated (i.e., the rack portions form/potentially form an angle θ with the horizon) as the roast is received within the formed gap 50, and, a portion of the roast will almost simultaneously be received upon an underlying serving platter, i.e., as the gap widens during continued rack portion withdrawal.

Finally, there are other variations of the subject invention, the roasting rack, and the support structure thereof, some of which will become obvious to those skilled in the art. It will be understood that this disclosure, in many respects, is only illustrative. Changes may be made in details, particularly in matters of shape, size, material, and arrangement of parts, as the case may be, without exceeding the scope of the invention.

What is claimed is:

1. A roasting rack assembly comprising:
   a. a roasting rack for receipt of a roast; and,
   b. a rack support structure comprising a frame for receipt of said roasting rack, and legs depending from said frame, said frame adapted to permit egress of said roasting rack therefrom in furtherance of delivering a roast from said roasting rack through said rack support structure and to a serving platter underlying said rack support structure, said frame comprising an upstanding rail to facilitate disengagement of a roast from said roasting rack with egress of said roasting rack from said frame, said roasting rack and said frame having substantially conforming perimeter configurations.

2. A roasting rack assembly comprising:
   a. a roasting rack for receipt of a roast; and,
   b. a rack support structure comprising a frame for receipt of said roasting rack, and leas depending from said frame, said frame adapted to permit egress of said roasting rack from a perimeter thereof in furtherance of delivering a roast from said roasting rack through said rack support structure and to a serving clatter underlying said rack support structure, said frame comprising an upstanding rail to facilitate disengagement of a roast from said roasting rack with egress of said roasting rack from said frame, said perimeter having a configuration selected from the group consisting of oblong, rectangular, or oval.

3. The roasting rack assembly of claim 1 wherein said roasting rack is withdrawable from a major edge of said frame.

4. The roasting rack assembly of claim 1 wherein said roasting rack is withdrawable from a minor edge of said frame.

5. The roasting rack assembly of claim 1 wherein said roasting rack includes a handle extending from an edge thereof.

6. The roasting rack assembly of claim 5 wherein said handle extends upwardly and outwardly from said edge.

7. The roasting rack assembly of claim 5 wherein said roasting rack is removable from said frame via substantially horizontal sliding thereof.

8. The roasting rack assembly of claim 5 wherein said roasting rack is removable from said frame via sliding said roasting rack at an angle of up to about 45° from a horizon.

9. The roasting rack assembly of claim 5 wherein said handle extends upwardly from said edge.

10. The roasting rack assembly of claim 5 wherein said handle extends outwardly from said edge.

11. The roasting rack assembly of claim 1 wherein said frame comprises a pair of spaced apart frame elements, said roasting rack reversibly received therebetween.

12. The roasting rack assembly of claim 11 wherein said rack support structure further comprises opposingly paired handles upwardly extending from said frame.

13. The roasting rack assembly of claim 12 wherein said opposingly paired handles and said legs are integrally formed.

14. The roasting rack assembly of claim 13 wherein said integrally formed handles and legs are united to said pair of spaced apart frame elements.

15. The roasting rack assembly of claim 1 wherein said rack support structure further comprises opposingly paired handles upwardly extending from said frame.

16. The roasting rack assembly of claim 1 wherein said rack support structure further comprises opposingly paired handles outwardly extending from said frame.

17. The roasting rack assembly of claim 1 wherein said rack support structure further comprises opposingly paired handles upwardly extending from said frame.

18. The roasting rack assembly of claim 1 wherein said upstanding rail comprises segments.

19. The roasting rack assembly of claim 1 wherein said upstanding rail extends from a perimeter of said frame.

20. The roasting rack assembly of claim 1 wherein said upstanding rail is substantially parallel with a major edge of said roasting rack.

* * * * *